June 8, 1943.  F. T. POWERS  2,321,156
X-RAY CASSETTE
Filed Jan. 31, 1942  2 Sheets-Sheet 2

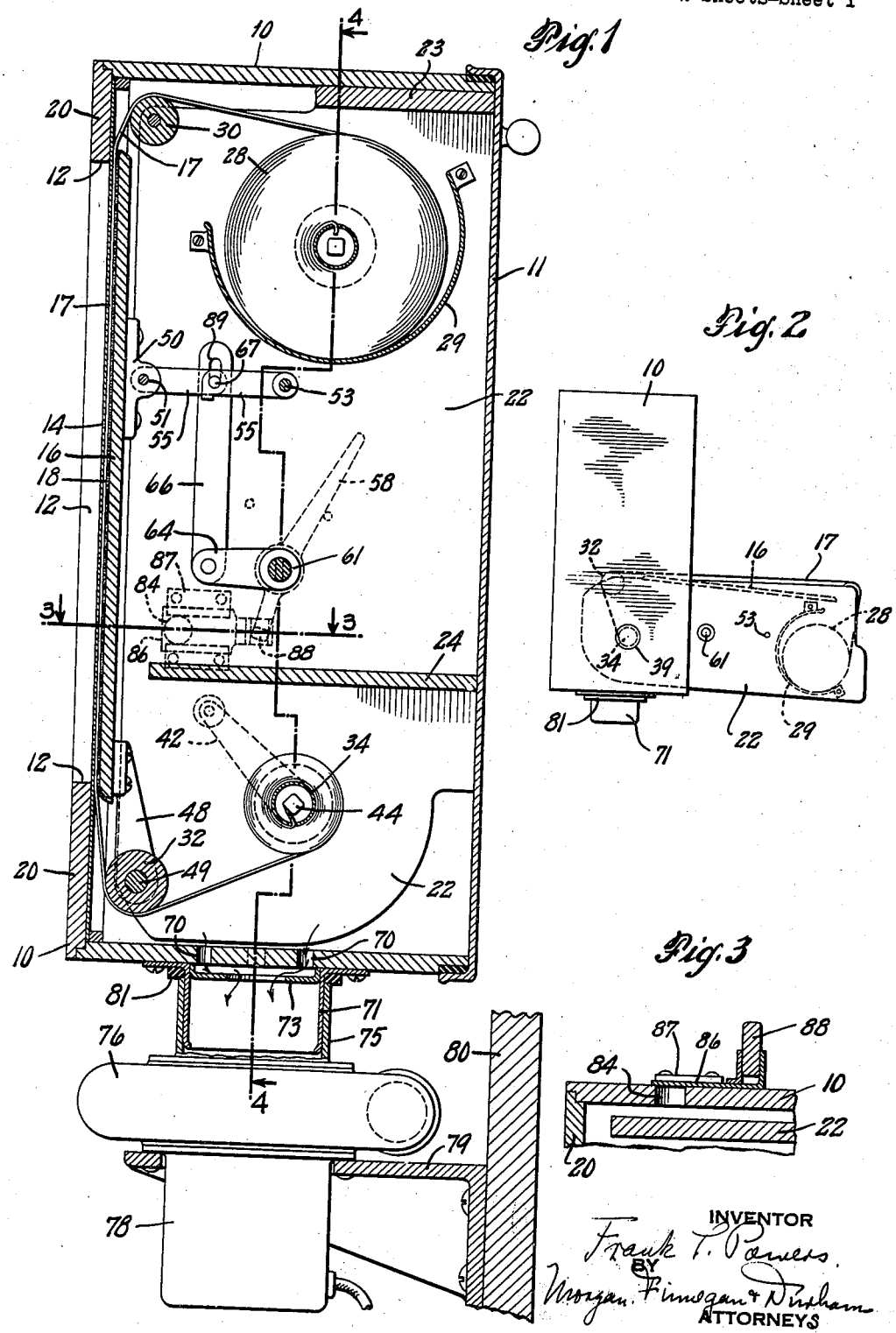

INVENTOR
Frank T. Powers
BY
Morgan, Finnegan & Durham
ATTORNEYS

Patented June 8, 1943

2,321,156

UNITED STATES PATENT OFFICE 2,321,156

X-RAY CASSETTE

Frank T. Powers, Glen Cove, N. Y.

Application January 31, 1942, Serial No. 428,994

14 Claims. (Cl. 250—66)

The present invention relates to new and useful improvements in X-ray cassettes.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate embodiments of the invention, and together with the description, serve to explain the principles of the invention.

Of the drawings:

Figure 1 is a vertical section showing a typical and illustrative X-ray cassette embodying the present invention;

Figure 2 is a side elevation of the embodiment shown in Figure 1 with the back removed and the support for the sensitive material swung back to facilitate replenishment of the sensitive material;

Figure 3 is a fragmentary sectional view taken on the line 3—3 of Figure 1; and

Figure 4:
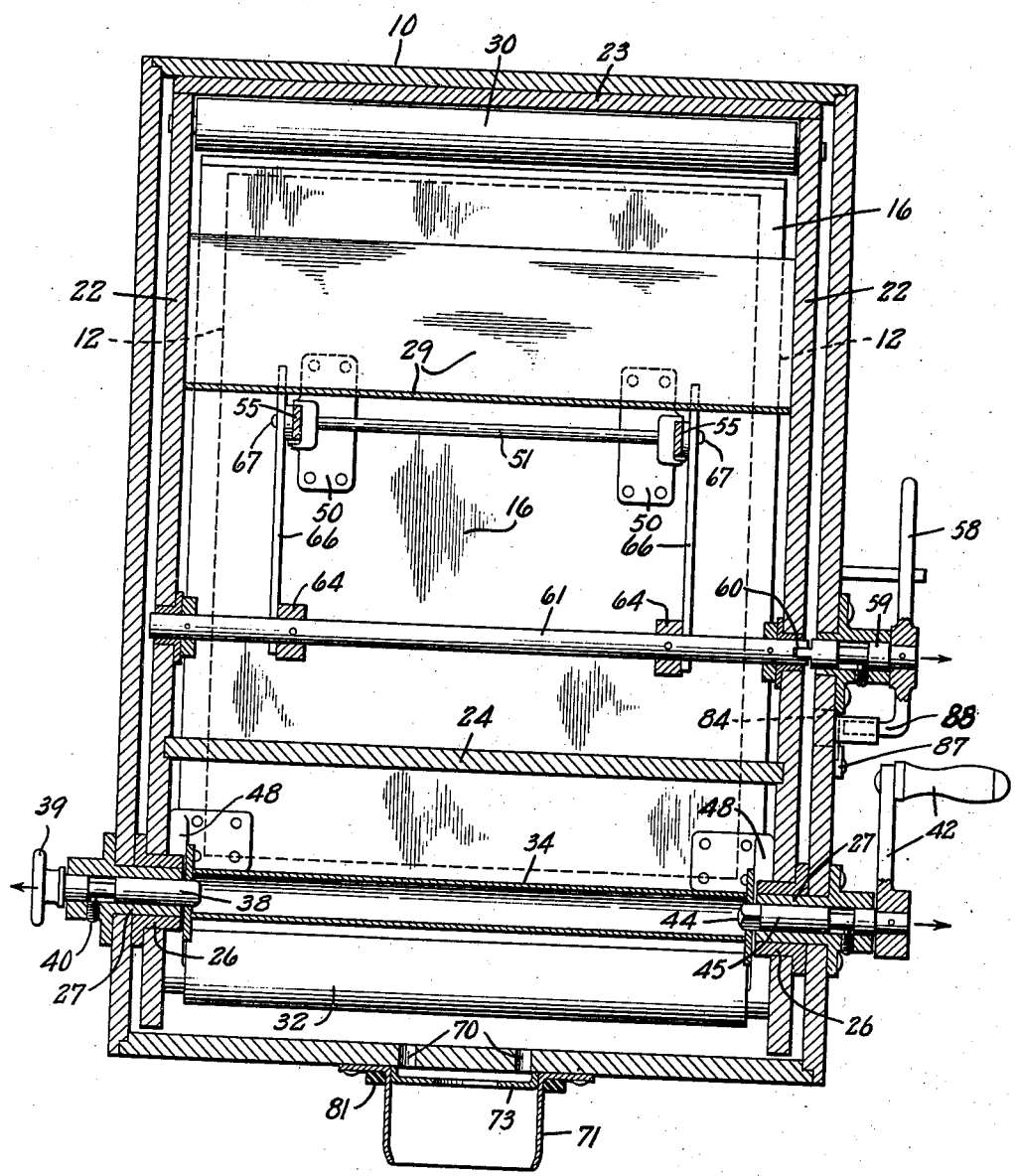
Figure 4 is a sectional view taken on the line 4—4 of Figure 1.

The present invention has for its object the provision of a novel and improved X-ray cassette which better insures the close, intimate and uniform contact of the sensitive material with its intensifying screen. A further object is the provision of an improved X-ray cassette in which the X-ray sensitive material is held in intimate contact with one or two intensifying screens by suction applied to the interior of the cassette. Still another object of the invention is the provision of a portable, relatively light weight cassette which insures intimate contact of the sensitive material with the intensifying screen, while easily permitting the sensitive material to be fed to and from exposure position from a roll of such material. The invention also provides a cassette, utilizing rolls of sensitive material and with which the sensitive material is held in exposure position by suction.

In accordance with the illustrative embodiment of the present invention there is provided a support for the sensitive material and a flexible sheet or window of material transparent to X-radiation but opaque to light, the window and support being adapted to receive between them the sheet or area of sensitive material to be exposed, with one or two intensifying screens positioned in intimate contact with the sensitive surfaces of the sensitized material. The support and window are normally spaced so as to receive the sensitive material and intensifying screen and provide an air-tight suction chamber communicating with an air duct and suction device so that when suction is applied to the chamber the flexible window is forcibly and evenly pressed towards the support thereby firmly pressing the sensitive material into intimate contact with the intensifying screen.

According to the illustrative embodiment of the invention, the sensitive material is adapted to be fed from a roll and after exposure is received on a reel so that a plurality of exposures can be made in quick succession and the sensitive material fed from one to the next exposure area, and after the required number of exposures have been made the reel may be removed from the cassette for development, etc. In this embodiment, the cassette comprises a light tight box provided with a light-tight air duct by which the cassette may be supported on a suction fan, and the screen support is adapted to be moved towards and from the window between exposures, thereby permitting easy and free movement of the sensitive material. While the suction source may be interrupted during the feeding of the film to relieve the pressure on the window, I preferably provide a valve means opened simultaneously with the movement of the support away from the window and simultaneously closed as the support is moved toward the window after a new area of sensitive material has been positioned in the exposure area, thereby simplifying the work of changing the next exposure. The sensitive material may conveniently be perforated across its width at regular intervals to facilitate separation of the different exposures, and the edges of the web may be notched at the perforations to cooperate with suitable signal means so the operator may be warned when a full length of the web has been fed, thereby bringing a new exposure area into exposure position. For instance, a finger connected to an external signal may press against the edge of the web, so that the signal is actuated when the finger enters the notch. The cassette as a whole is relatively light in weight and can be easily detached from the source of suction when the exposed sensitive material is to be removed or replenished.

It will be understood that the foregoing general description and the following detailed description as well are exemplary and explanatory of the invention but are not restrictive thereof.

Referring now in detail to the illustrative embodiment of the invention as shown in Figures 1 to 4 of the accompanying drawings, the sensitive material is provided in roll form and may comprise a web of paper coated on one side with an emulsion sensitive to X-radiation or a web of transparent film coated on one or both sides with such an emulsion. If coated on only one side, the emulsion is preferably positioned away from the patient and the source of X-radiation. The roll of sensitive material is supported in the cassette which comprises a box like member 10, having a removable back cover 11 and provided at its front with a rectangular opening 12 which is closed against light and air by means of a thin relatively flexible sheet of light-opaque material transparent to X-radiation, such as a thin sheet or window of Bakelite 14, at least as large as the X-ray image to be recorded on the sensitive material.

Supporting means are provided for the sensitive material and comprise the rigid backing member 16 normally adjacent to the Bakelite sheet 14 and spaced therefrom only by the sensitive material 17 and the intensifying screen 18 which is mounted on the front face of the backing member 16. The backing member 16 is slightly larger than the opening 12 and it and the front wall 20 of the box are preferably made of material to shield the interior of the box from the X-radiation.

A pivoted frame is mounted within the box and comprises the side members 22 spaced apart and braced by the cross members 23 and 24 to form a rigid frame, extending from near the support 16 rearwardly of the box and into contact with the back cover member 11. The frame is preferably pivotally mounted in the box on the sleeves 26 journalled on the flanges 27, and the lower portion of the frame is arcuately shaped so as to permit pivotal movement of the frame.

The feed roll 28 of sensitive material is supported in the upper portion of the box by means of the trough 29 extending from one side frame member 22 to the other and shaped approximately to fit the maximum diameter of the roll 28. The sensitive material is rolled with its sensitive surface inwardly on the roll so that it is not damaged by rubbing on the trough. A roller 30 is also provided at the upper front portion of the frame so that the material may be fed over it, thence downwardly between the backing member 16 and the window 14, over roller 32 and onto the take-up reel 34.

Take-up reel 34 is mounted for rotation by means of pin 38 which projects through sleeve 26 at one side of the cassette and may be moved inwardly and outwardly by knob 39, being held in its inward position by a detent 40. Pin 38 engages in a hole in the reel center and the reel may turn freely thereon. At the other end, the reel 34 is rotatably mounted for manual rotation by means of a handle 42 which is rotatably journaled in the sleeve 26 and is provided with a square end 44 to engage in a square hole centrally of the reel, and the shaft 45 may also be moved inwardly and outwardly to permit removal and insertion of the take-up reel.

The handle 42 pushed in, as shown in Figure 4, turning of the handle draws sensitive material from the supply roll 28 and winds it up on the reel 34, thereby providing successive fresh areas of sensitive material at the opening 12.

In order to permit free passage of the sensitive material past the opening 12, means are provided for moving the support 16 towards and from the Bakelite window 14, the backing member being spaced while the material is fed. As embodied the backing member 16 is mounted on brackets 48 about the shaft 49 on which the roller 32 is rotatably mounted, while at its upper end backing member is provided with a toggle connection to a cross bar between the frame members 22. On the back of the backing members are mounted brackets 50 between which extends a shaft 51, and a parallel shaft 53 is provided extending between the frame members 22. Between these shafts are a plurality of toggles 55 which in their made position, press the backing member 16 and its supported material almost or fully into contact with the Bakelite window 14, while in their broken position, the toggles 55 move the backing member pivotally about the shaft 49 thereby providing clear space between the backing member and the Bakelite window 14.

Means are provided for externally operating the backing member to move it into exposure or feeding position, and for this purpose there is provided an external bell crank 58 mounted on and adapted to turn a shaft 59 which has a flat end which projects into the slotted end 60 of shaft 61 journalled in the side frames 22, to turn the shaft 61, at the same time not interfering with the pivotal movement of the frames 22 about their pivots 26. Shaft 61 is provided with arms 64 which are connected by links 66 to the pivot pins 67 of the toggles 55 so that movement of the bell crank 58 operates the toggles and moves the backing member between exposure and feeding positions.

A light-tight air duct is provided communicating with the interior of the cassette so that the pressure of the air within the cassette may be reduced to forcefully press the window 14 against the sensitive material and its intensifying screen, and this duct preferably provides means for supporting the cassette so that it may be easily and quickly removed. As embodied, there are provided a plurality of holes 70 in the bottom wall of the cassette. On the exterior, these holes 70 are covered by a flange 71 having in it an apertured plate 73, the aperture in this plate being staggered with respect to the holes 70 so that no light can enter the cassette, while free egress of the air within the cassette is permitted.

Flange 71 provides a connection with the intake 75 of a centrifugal blower 76 driven by motor 78 and supported by bracket 79 on a wall 80 or other convenient support. A gasket 81 may be provided for improving the seal between the cassette and the blower.

In order to expedite taking successive exposures, means are provided for quickly destroying and reestablishing the reduced pressure within the cassette automatically with the movement of the backing member 16 to and from exposure position. As embodied, one wall of the cassette is apertured at 84 to provide an air valve which will admit air into the interior of the cassette thereby permitting the backing plate 16 to be moved away from the window 14 without injury to the thin flexible sheet of Bakelite. Aperture 84 is normally covered by a flexible rubber flap 86 which is guided to and from closing position by means of the guide channels 87 and is connected for movement by the depending arm 88 of the bell-crank 58 so that as the backing plate is moved away from the window 14 by the breaking of the toggle 55 the suction within the cassette is destroyed before any substantial movement of the backing plate has taken place, and this may be further insured by providing a slot 89 in the links 66 so that unsealing of the aperture 84 takes place before any movement of the toggle has taken place.

With the backing plate 16 away from the window 14, and with the suction within the cassette relieved, handle 52 may be turned to draw down into exposure position a new area of sensitive material, after which the lever 58 is moved in the opposite direction to seal aperture 84 and restore the backing plate to the position shown in Figure 1, after which further increase in the suction presses cover 11 against the back side of the frame members 22 to support the backing plate 16 and the window 14 is drawn into forceful contact with the sensitive material 17 pressing it into uniform contact with the intensifying screen 18, insuring sharp images. During the exposure period, the motor 78 and fan 76 are continued in operation, and they need not be shut down even while cassettes are being changed.

When the roll of sensitive material 23 has been duly exposed and wound on the reel 34, the cassette as a whole is removed from the fan and may be taken to the dark room for development of the roll of sensitive material and for replenishment of the sensitive material with a new roll 28.

A high vacuum is not needed for the type of apparatus shown in Figures 1 to 4, although a considerable degree of suction may be employed. It has been found that the suction developed by a conventional type of centrifugal blower is ample and produces a pressure between the sensitive material and intensifying screen which is much greater than that normally created by the spring or toggle pressure plates of conventional cassettes and is much more uniform than has heretofore been employed.

The invention in its broader aspects is not limited to the specific mechanisms shown and described but departures may be made therefrom within the scope of the accompanying claims without departing from the principles of the invention and without sacrificing its chief advantages.

What I claim is:

1. An X-ray cassette including in combination a closed container having a flexible window, means for supporting an intensifying screen and sensitive material adjacent the window and within the container, means for relatively moving the support and window and means for applying suction to the interior of the container to force the sensitive material into firm uniform contact with the intensifying screen by pressure of the window towards the support.

2. An X-ray cassette including in combination a closed container having a flexible window, means for rigidly supporting an intensifying screen and sensitive material adjacent the window and within the container, means for relatively moving the support and window and means for applying suction to the interior of the container to force the sensitive material into firm uniform contact with the intensifying screen by pressure of the window towards the support said suction applying means comprising a light-tight air duct.

3. An X-ray cassette including in combination a closed container having a flexible window, means for supporting an intensifying screen and sensitive material adjacent the window and within the container, means for relatively moving the support and window and means for applying suction to the interior of the container to force the sensitive material into firm uniform contact with the intensifying screen by pressure of the window towards the support, an air valve and means for opening and closing the valve simultaneously with the relative movement of the support away from and toward the window.

4. An X-ray cassette including in combination a box-like container having a flexible window, means for supporting an intensifying screen and sensitive material adjacent the window and within the container, means for relatively moving the support and window for movement of the sensitive material, a suction fan to which the container is removably connected, cooperating air connections between the fan and the interior of the container and including a light-trap whereby the cassette may be removed from the fan without admitting light to the interior of the cassette.

5. An X-ray cassette including in combination a box-like container having a flexible window, means for supporting an intensifying screen and sensitive material adjacent the window and within the container, means for relatively moving the support and window for movement of the sensitive material, a suction fan to which the container is removably connected by an air duct, an air valve for admitting air to the container and means for concomitantly moving the support and air valve whereby air is admitted to the container when the support and window are relatively moved apart.

6. An X-ray cassette including in combination a box-like container having a flexible window, means for supporting an intensifying screen and sensitive material adjacent the window and within the container, means for relatively moving the support and window for movement of the sensitive material, a suction fan to which the container is removably supported, cooperating air connections between the fan and container to reduce the air pressure within the container, said connections including telescoping tubes, one attached to the container and surrounding holes in the container and a light trap covering the holes.

7. An X-ray cassette including in combination a flexible front sheet opaque to light and transparent to X-radiation, a backing member movable towards and from the sheet, means for initially applying pressure to the backing member to press sensitive material and an intensifying screen against the front sheet, and means for applying suction to the flexible sheet to force the sensitive material and screen against the backing member.

8. An X-ray cassette including in combination a flexible front sheet opaque to light and transparent to X-radiation, a backing member movable towards and from the sheet, a housing enclosing the backing member and one face of the front sheet and adapted to receive sensitive material and an intensifying screen between the flexible sheet and backing member, an air duct communicating with the housing to apply suction to the rear face of the front sheet, said cassette being adapted to be removably connected with a suction device through said air duct, said air-duct constituting a light-trap to prevent fogging of the sensitive material by light.

9. An X-ray cassette including in combination a box-like container having a flexible window, means for supporting a supply of sensitive material within the container, means for drawing sensitive material past the window, a backing member movable relatively to the window and towards which the material may be pressed by the window, and means for reducing the air pressure within the container whereby the window forcefully presses the material towards the backing member.

10. An X-ray cassette including in combination a box-like container having a flexible window, means for supporting a supply of sensitive material within the container, means for drawing sensitive material past the window, a backing member movable relatively to the window and towards which the material may be pressed by the window, and means for reducing the air pressure within the container whereby the window forcefully presses the material towards the backing member said supporting means comprising a frame engaging one wall of the container and supporting the wall against suction, and pivoted within the container whereby it may swing for replenishment of the supply.

11. An X-ray cassette including in combination a box-like container having a flexible window, means for supporting a supply of sensitive material within the container, means for drawing sensitive material past the window, a backing member movable relatively to the window and towards which the material may be pressed by the window, and means for reducing the air pressure within the container whereby the window forcefully presses the material towards the backing member, said supporting means comprising a pivoted frame on which the backing member is pivotally mounted, whereby the frame and backing member may be swung for replenishment of the supply.

12. An X-ray cassette including in combination a box-like container having a flexible window, means for supporting a supply of sensitive material within the container, means for drawing sensitive material past the window, a backing member movable relatively to the window and towards which the material may be pressed by the window, and means for reducing the air pressure within the container whereby the window forcefully presses the material towards the backing member, said supporting means comprising a pivoted frame on which the backing member is pivotally mounted for movement relative to the window, and means for holding the supporting means in a fixed position as the pressure within the cassette is reduced.

13. An X-ray cassette including in combination a box-like container having a flexible window, means for supporting a supply of sensitive material within the container, means for drawing sensitive material past the window, a backing member movable relatively to the window and towards which the material may be pressed by the window, and means for reducing the air pressure within the container, whereby the window forcefully presses the material towards the backing member and means external to the container for relatively moving the window and backing member.

14. An X-ray cassette including in combination a box-like container having a flexible window, means for supporting a supply of sensitive material within the container, means for drawing sensitive material past the window, a backing member movable relatively to the window and towards which the material may be pressed by the window, and means for reducing the air pressure within the container, whereby the window forcefully presses the material towards the backing member said drawing means extending through the container for external manual operation.

FRANK T. POWERS.